M. THIBAULT.
Cut-Nail Machines.
No. 149,961.        Patented April 21, 1874.
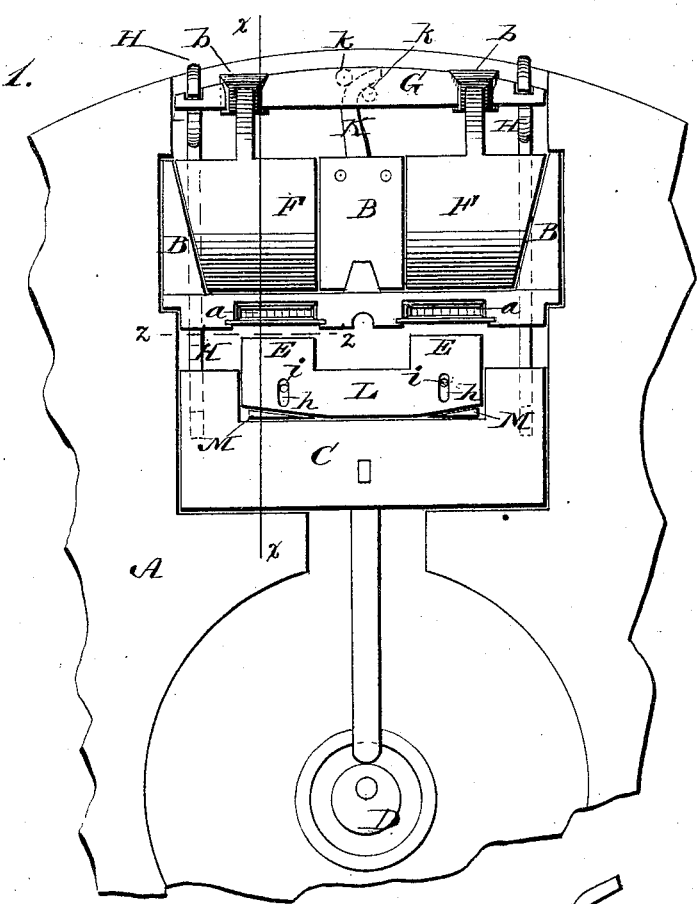
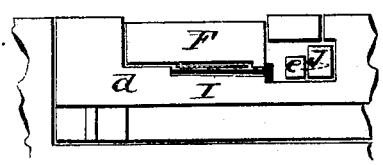
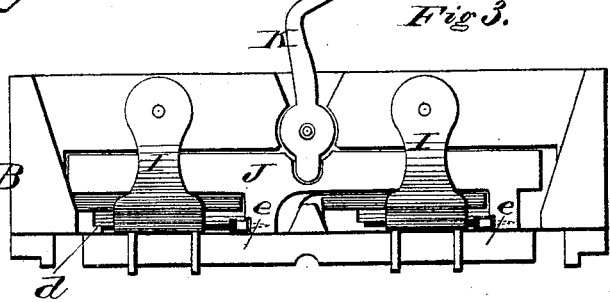
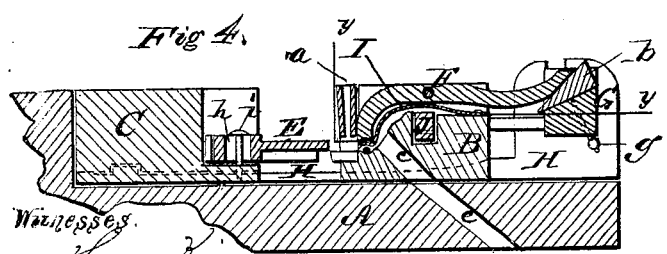
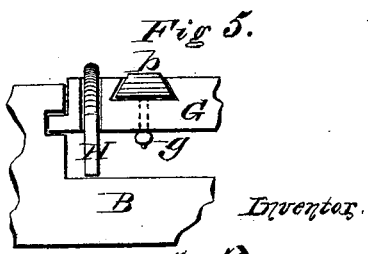
Witnesses: Harry King, W. H. Dodge
Inventor: M. Thibault By Dodge & Son Attys

UNITED STATES PATENT OFFICE.

MAGLOIRE THIBAULT, OF HULL, ASSIGNOR OF ONE-HALF HIS RIGHT TO SAMUEL BENOIT, OF OTTAWA, CANADA.

IMPROVEMENT IN CUT-NAIL MACHINES.

Specification forming part of Letters Patent No. 149,961, dated April 21, 1874; application filed February 6, 1874.

*To all whom it may concern:*

Be it known that I, MAGLOIRE THIBAULT, of Hull, in the county of Ottawa, in the Province of Quebec and Dominion of Canada, have invented certain Improvements in Nail-Machines, of which the following is a specification:

This invention relates to the nail-cutting machine for which Letters Patent were granted to me on the 16th day of December, 1873; and consists in a nail-heading attachment therefor, and in a novel manner of supporting and adjusting the punches or cutting-blades, as hereinafter fully described.

Figure 1 is a top-plan view of my heading devices applied to my patent machine. Fig. 2, a face view of one of the clamping-jaws and header, looking outward from the line $z\ z$ of Fig. 1. Fig. 3 is a top-plan view, showing the whole or double heading attachment, with the clamping or griping jaws detached. Fig. 4 is a vertical section through the entire heading apparatus on the line $x\ x$. Fig. 5 is an outside elevation, showing one of the inclines by which the clamping-jaws are operated.

A represents the bed-plate of the machine, made, as set forth in my patent, of a circular form, and provided around its outer side with a series of stationary dies or head-blocks, B, and with a corresponding series of sliding head-blocks, C, which are provided with the cutting blades or punches, and are all operated by a single eccentric, D, located in the center of the bed. E E are the cutters or punches, of which there are two on the outer side of each sliding head C, so arranged that, as the head moves forward, they shear off the nail-blanks, and carry them into the stationary head B, the iron plates being fed down vertically through the openings $a$ in front of the cutters. On the stationary head B, opposite the cutters or punches, I pivot two jaws or clamps, F, to gripe and hold the nail-blanks while the heads are being formed thereon.

The arrangement of parts is such that when the advancing cutters E shear off the nail-blanks, they force them forward under the inner or forward ends of the jaws or clamps F. The jaws or clamps are operated and caused to gripe the nails by inclines $b$ on a transverse bar, G, which is mounted under the outer ends of the jaws on the ends of two sliding bars, H, which pass under the head B, and are attached, at their inner ends, to the sliding head C, as shown in Figs. 1 and 4. As the head C is drawn back, after the cutters have operated, it draws the bars H and transverse bar G inward, so so that the inclines $b$ on the latter are caused to raise the outer ends of the jaws F, and thereby clamp the nail-blanks under their forward ends, as shown in Fig. 4. As the sliding head and its cutters again advance, the bar G, with its inclines, recedes, and releases the jaws and the nail-blanks thereunder.

An inclined opening, $c$, is made down through the head B and the bed-plate, as shown in Fig. 4, to permit the escape of the nails, each of which, after being headed, is forced back into the opening by the entrance of the next blank. In order to prevent the blanks from accidentally passing into the outlet-opening before they are griped by the jaws F, I mount under each jaw a spring-plate, I, having its lower front edge curved in such manner as to hold the nail-blank when it is forced thereunder by the cutter or punch. The inner ends of the pivoted jaws F bear directly upon the ends of the spring-plates, so that when they descend to gripe the nail-blank, the plate lies between them and the blank, as shown in Figs. 2 and 4.

The heading is performed by a bar, J, which is provided with two shoulders or anvils, $e$, and is mounted in the head B below the jaws F, as shown in Figs. 3 and 4. This bar is arranged to slide endwise, and is so arranged as that its shoulders or anvils extend forward opposite the ends of the blanks held under the jaws F, as shown in Figs. 2 and 3, so that when the bar is moved, the shoulders are forced up against the ends of the blanks, and caused to upset their ends, and form the heads thereon. The parts are so arranged and adjusted that the large ends of the blanks project out slightly beyond the side of the griping-jaws, as shown in Figs. 2 and 3, in order that the heading operation may be performed. The small ends of the blanks are supported, while the heading is being done, against shoulders $d$, formed in the solid metal of the stationary head B, as clearly shown in Figs. 2 and 3.

The heading bar or slide J is operated by a lever, K, which is pivoted to the head B, and the outer end of which is curved, and arranged to work between two rollers, k, on the transverse bar G, as shown in Figs. 1 and 3, so that, as the said bar is drawn inward, the rollers move the lever K, and cause it to operate the heading-bar. The parts are so arranged that the header does not act until the jaws F have first griped the blanks firmly.

In order that the jaws may be caused to bear with more or less pressure on the nail-blanks, and that they may be adjusted to hold nails of different sizes, the inclines b may be mounted in grooves in the bar G, and fastened by set-screws g, as shown in Figs. 4 and 5, so that they may be adjusted, and caused to raise the ends of the jaws more or less.

The arms or shoulders on the heading-bar J may be provided with detachable faces, as shown in Figs. 2 and 3. This arrangement permits the application of new faces when the old ones become worn, and the application of faces of different forms and sizes, and of faces having letters or designs in or upon them, to mark the heads.

The spring-plates I, although of advantage, may be omitted, as the machine will operate well without them.

The cutting blades or punches E are either formed upon, or secured firmly to, a plate, L, which is set down into a recess or depression in the head C, as shown in Figs. 1 and 4. The plate is provided with slots h, and is held down in place by bolts i, passing down through said slots. The rear corners of the plate are beveled off, and it is given a solid support by wedges M, placed behind the beveled corners, and against the rear side of the recess or depression, as shown in Figs. 1 and 4. As the blades become shortened by wear, the screws i are loosened, the plate L moved forward, the wedges set up behind the plate, and then the screws again tightened.

By means of the screws and wedges, the cutters are given a perfectly-solid support, and, at the same time, their quick and accurate adjustment permitted.

Having thus described my invention, what I claim is—

1. In combination with the sliding head C, carrying the cutters or punches, the pivoted jaws F, sliding bar J, lever K, and bars G H, arranged and operating substantially as shown and described.

2. In combination with the sliding head C, carrying the cutters or punches, the bars H and G, and the pivoted jaws F, as shown and described.

3. In combination with the griping-jaws F, the sliding heading-bar J, provided with the arms or shoulders e.

4. In combination with the cutter E, clamping-jaw F, and discharge-opening, the spring-plate, secured under the clamping-jaw, as shown, to receive the nail-blank from the cutter, and retain it until the griping-jaw descends, as set forth.

5. In combination with the recessed head C, and the slotted plate L, having the cutters attached to or formed upon it, the bolts I and wedges M, for holding and adjusting the plate, as shown and described.

6. In combination with the heading-bar J, the lever K and the movable bar G, having the rollers k.

MAGLOIRE THIBAULT.

Witnesses:
WILLIAM WILSON,
T. G. COURSOLLES.